INVENTORS
ROBERT P. ALGER &
JOHN T. DEWAN

BY John P. Sinnott

ATTORNEY

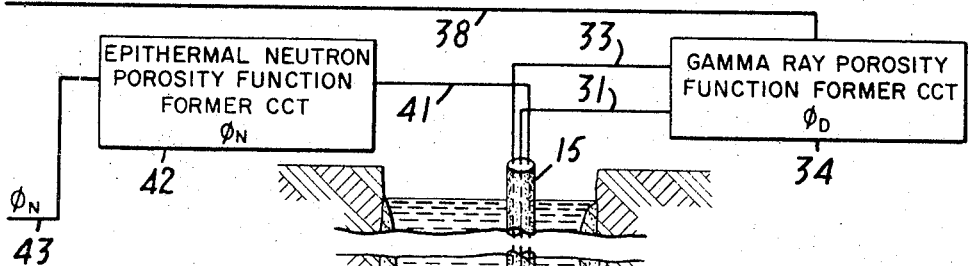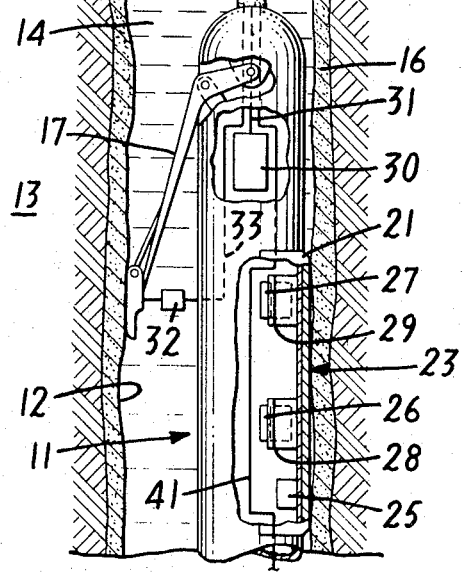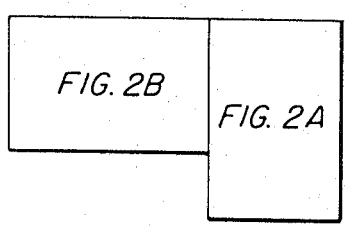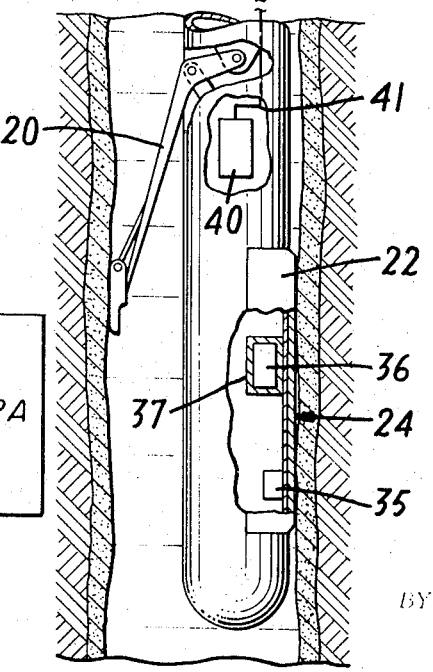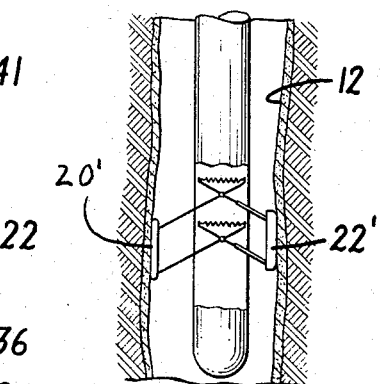

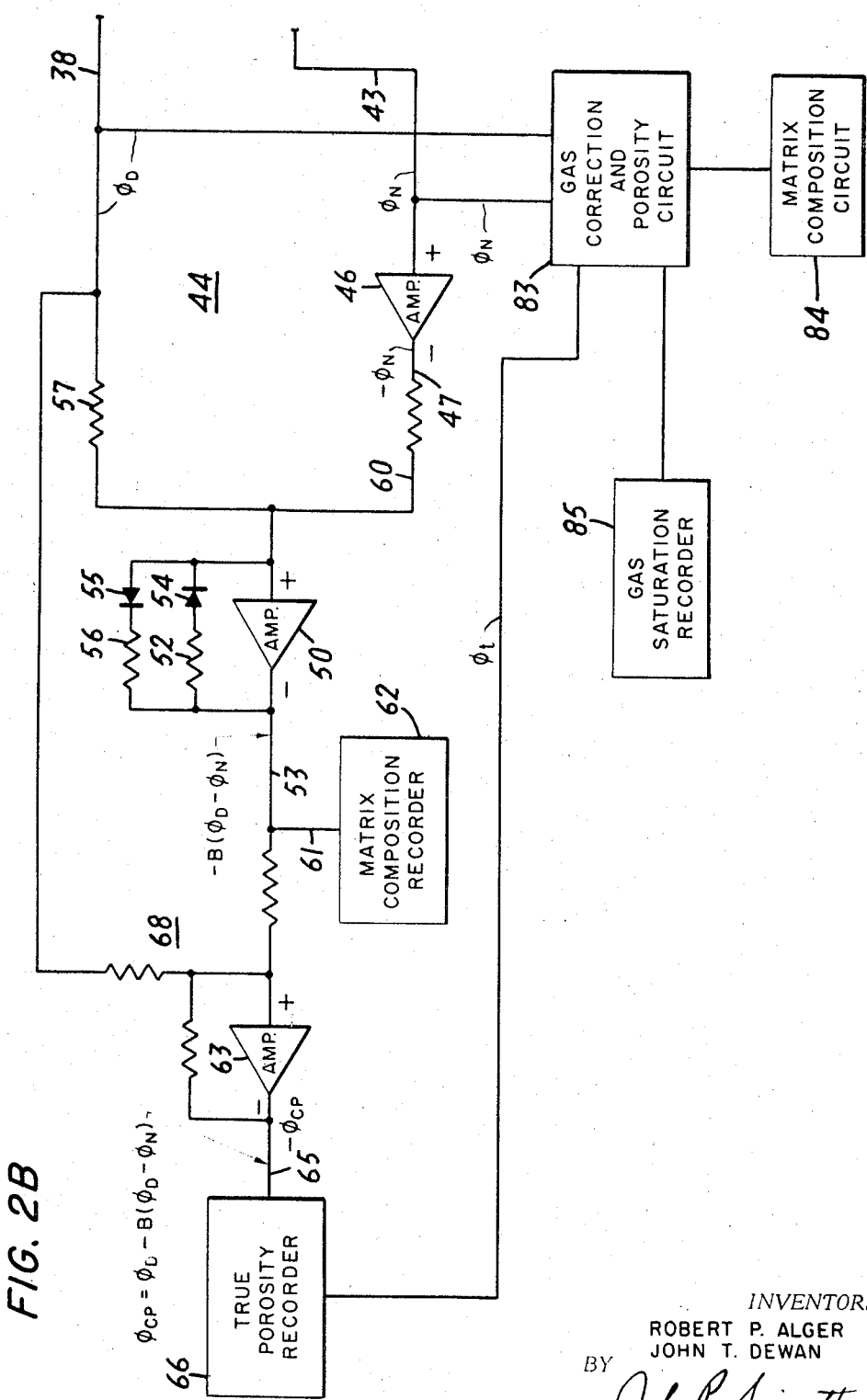

United States Patent Office 3,453,433
Patented July 1, 1969

3,453,433
COMBINED SIDEWALL NEUTRON POROSITY GAMMA-GAMMA TOOL
Robert P. Alger and John T. Dewan, Houston, Tex., assignors to Schlumberger Technology Corporation, Houston, Tex., a corporation of Texas
Filed Dec. 8, 1966, Ser. No. 600,197
Int. Cl. G01t 1/16, 3/00
U.S. Cl. 250—83.3      10 Claims

ABSTRACT OF THE DISCLOSURE

A specific embodiment of the invention provides a technique for measuring the porosity, matrix composition or gas saturation of an earth formation surrounding a borehole. The porosity may be measured by combining porosity-dependent signals derived from epithermal neutron radiation with porosity signals from a gamma-gamma density tool. The combined signals produce more accurate indications of formation porosity and also provide an indication of matrix lithology or gas saturation.

---

This invention relates to well logging methods and apparatuses, and more particularly to methods and apparatuses for computing earth formation porosity and the like through a novel combination of measurements derived from nuclear phenomena.

Oil or gas deposits often can be identified through the porosity of the earth formation surrounding a borehole. Consequently, techniques that determine formation porosity with accuracy are of substantial interest to the oil and natural gas industries.

When the lithology, or the character of the rock formation surrounding a borehole is known, bulk density and porosity can be computed accurately by measuring the attenuation within the rock structure of gamma rays or neutrons, respectively, that radiate from tools placed within the borehole. As a practical matter, however, the precise nature of the rock structure seldom is known. In the usual situation the formation under study is a "mixed lithology," or a rock matrix composed of unknown fractions of two or more minerals, such as limestone and sandstone or dolomite and limestone.

Consequently, interpretation of these gamma ray ("gamma-gamma" logs) and neutron measurements often is in error because the gamma-gamma logging technique is subject to imprecisely known variations in mineral grain density and the neutron technique is sensitive to mixed lithologies. Accordingly, a need exists for methods and apparatuses that more accurately measure formation porosity in mixed lithologies. There also is a need for a satisfactory technique that can produce a quick and reliable indication of the relative proportion of the minerals present in these mixed lithologies. Such a technique, moreover, should not involve an expensive and time consuming laboratory analysis of drill cuttings or formation core samples. Alternatively, where the lithology is known, a method and apparatus for identifying natural gas-bearing formations would be of substantial technical significance.

Well logging techniques have been proposed in the prior art to satisfy these needs. These proposed techniques have suggested methods for combining the formation bulk density derived from gamma-gamma logs with the formation porosity derived from measuring the gamma rays emitted by the formation as a consequence of neutron irradiation. The specific combination of these data should produce a more accurate indication of formation porosity than that which would be available through either the gamma-gamma or neutron logs alone. This proposed data combination also should provide some measure of the fraction of each mineral present in mixed lithologies. Moreover, where the rock structure is known, this suggested technique could be used to identify natural gas-producing zones through a comparison of any inconsistencies that might exist between the computed porosity and the actual formation porosity and mineral composition.

These proposed techniques have not been entirely satisfactory. Specifically, the determination of formation porosity through the observation of neutron induced gamma radiation has introduced inaccuracies that tend to degrade the quality of the porosity developed through the aforementioned proposed data combination. These inaccuracies are attributable in a large measure to the absorption in some formation nuclei of the irradiating neutrons that have kinetic energies in thermal equilibrium with the formation. Thus, certain elements that frequently are present in formations of interests, such as boron, lithium, and chlorine, have a very high probability for absorbing these thermal neutrons. The absorption probabilities, or neutron absorption cross sections, that characterize these elements distort the balance that the formation porosity ordinarily would establish between the thermal neutron population and those irradiating neutrons that have higher, or epithermal energies. Consequently, it was found that the gamma rays emitted from reactions between the irradiating thermal neutrons and the formation nuclei did not provide a fully reliable indication of formation porosity.

Accordingly, it is an object of the invention to indicate formation porosity with greater accuracy.

It is another object of the invention to contrast formation parameters derived from neutron measurements with those derived from a gamma-gamma log to develop a formation porosity that is not subject to inaccuracies caused by thermal neutron effects.

It is still another object of the invention to irradiate mixed lithologies with neutrons and gamma rays, and to combine the data thereby acquired to produce a more reliable indication of the proportionate mixture of those minerals that comprise the irradiated lithologies.

It is a further object of the invention to identify more precisely gas-bearing earth structures through a comparison of formation parameters obtained with neutron and gamma-gamma logs.

In accordance with the invention, formation porosity and rock structure mineral composition, or alternatively, the location of gas-producing zones, are determined accurately by combining formation parameters acquired through epithermal neutron and gamma-gamma logs. More particularly, formation characteristics are identified through a technique that eliminates those sources of error inherent in measurements that depend at least in part on thermal neutron induced gamma ray effects.

A specific embodiment of the invention has one well logging tool or sonde that continuously radiates neutrons into the formation under study and samples only those neutrons in the irradiating neutron population that are at epithermal energies. A gamma-gamma device, comprising a source of gamma rays and means for measuring the attenuation of these rays in the formation is spaced from the epithermal neutron apparatus within the same tool. The entire tool, moreover, is positioned eccentrically within the borehole. This decentralized tool arrangement enables the neutron and gamma ray sources and their associated detection equipment to abut the irradiated formation. The abutting relationship further reduces errors caused by "borehole effects," such as the presence of drilling mud, irregularities in the shape of the borehole and the like.

A computer also is provided to produce signals that correspond to the formation porosity and matrix composition by combining the epithermal neutron and gamma-gamma information according to an empirically developed relationship. If, however, the porosity and matrix composition are known, the computer produces a signal that indicates the presence of a gas-bearing formation.

For a better understanding of the present invention, together with other and further objects thereof, reference is had to the following description taken in connection with the accompanying drawings, the scope of the invention being pointed out in the appended claims.

Referring to the drawings:

FIGURES 2A and 2B are a schematic diagram of a well logging tool according to one embodiment of the invention showing the electrical equipment associated therewith in block diagram form;

FIGURE 3 shows the general arrangement of FIGURES 2A and 2B; and

FIGURE 4 is a schematic diagram of another embodiment of a well logging tool according to the invention.

Figure 1:
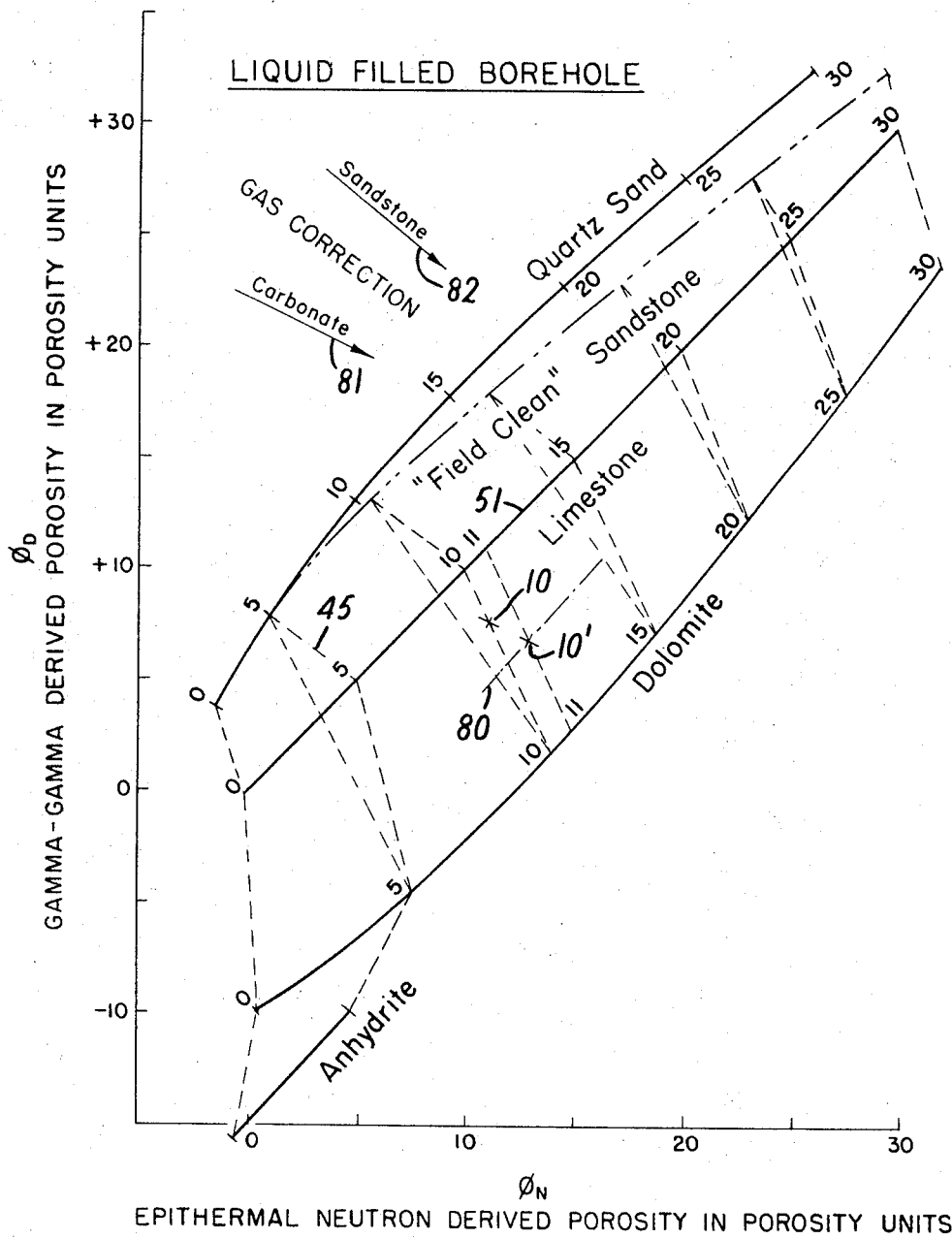
FIGURE 1 is a representative graph of true formation porosity for different rock structures in terms of gamma ray and epithermal neutron derived porosities measured in liquid-filled boreholes.

For more complete appreciation of the principles and advantages of the present invention, a graph showing true formation porosity as a function of formation porosities derived from the attenuation of epithermal neutrons $\phi_n$ and gamma rays $\phi_d$ in a liquid-filled borehole surrounded by limestone, dolomite, quartz sand, "field clean" sandstone, or anhydrite rock structures is presented in FIGURE 1. The graph in FIGURE 1 was prepared through measurements of epithermal neutron and gamma ray porosity values in earth formations in which the true porosities were known with accuracy. The graph enables the entering arguments $\phi_n$ and $\phi_d$ to be combined to produce a more precise formation porosity, $\phi_{cp}$, because of different response to matrix composition of the two measurements. Thus, the gamma-gamma derived porosity $\phi_d$ is subject to error caused by departures in the actual formation mineral grain density from an assumed value. On the other hand, the epithermal neutron derived porosity $\phi_n$ is effected by the macroscopic neutron slowing down properties of the matrix. Accordingly, the combination of these two porosities is more accurate than either of the input data taken alone.

Illustratively, in an earth formation which is known from drill cuttings or the like generally to contain limestone and dolomite, if $\phi_n$ has a value of eleven porosity units and the value of $\phi_d$ is seven porosity units, a point 10 is identified on the graph. Point 10 is between the limestone and dolomite curves on a line of constant porosity of ten porosity units, which indicates that the true formation porosity has a value of ten units. The point 10, moreover, is approximately 60 percent of the distance from the dolomite curve and 40 percent of the distance from the limestone curve on the ten porosity unit line. This relative position of point 10, between the limestone and dolomite curves, indicates that the formation is a mixed lithology comprised of approximately 60 percent limestone and 40 percent dolomite. The porosity and proportionate mineral composition of mixtures of limestone and "field clean" sandstone; limestone and quartz sand; "field clean" sandstone and dolomite; or dolomite and anhydrite can be determined in a similar manner. The term "field clean" sandstone is defined as the cleanest sandstones surrounding the boreholes selected to provide the test data from which the graph in FIGURE 1 was constructed. These standstones would be classified as clean through visual inspection, although small amounts of impurities were present in the sandstones, such as shale, feldspar or the like.

As noted in FIGURE 1, the graph shown therein applies only to liquid- or mud-filled boreholes. A group of curves similar to those shown in FIGURE 1 for air- or gas-filled boreholes can be drawn up from other readily available field and laboratory data.

An illustrative embodiment of a practical apparatus for identifying formation porosity and matrix lithology in accordance with these principles is shown in FIGURES 2A and 2B.

As shown in FIGURE 2A, the tool comprises a fluid-tight pressure resistant housing 11 adapted to pass through a borehole 12 that traverses earth formations 13. The borehole 12 may be dry or may be filled with water-base or oil-base drilling mud 14 as shown. Housing 11 is suspended in the borehole 12 by an armored cable 15 which may contain a group of insulated conductors for transmitting signals to the earth's surface. A winch (not shown) located at the surface of the earth is used to lower and raise the housing in the borehole in the customary manner to traverse the earth formations 13.

Borehole 12 may be lined with a mudcake 16 which usually forms in uncased boreholes when the liquids in the drilling mud invade or seep into the earth formations 13 surrounding the borehole 12 and deposit a residue of solid matter on the borehole walls. Because the mudcake 16 is a layer of material that essentially is unrelated to the matrix composition and formation porosity, the mudcake 16 introduces a factor that degrades the accuracy of the nuclear measurements to be described subsequently.

To counteract in part the effect of the mudcake 16 and the influence of other borehole effects, such as caving, borehole diameter variations, and neutron thermalization in the hydrogenous drilling mud 14, decentralizing arms 17 and 20 are pivotally attached to the housing 11 and are biased to provide a radially directed force which presses the housing 11 against the adjacent portion of the mudcake 16 and the borehole wall 12. The eccentric position of the housing 11 prevents the drilling mud 14 from intervening between the skids 21 and 22 and the portion of the formation 13 under consideration and thereby disturbing the measurement of formation characteristics. The radial force pressing the skids against the formation also serves to reduce the thickness of the mudcake 16.

In order to enable the skids 21 and 22 to follow borehole wall undulations, another embodiment of a tool according to the invention is shown in FIGURE 4. A housing 11' has independently mounted protruding skids 21' and 22' linked to respective individually biased back-up or decentralizing arms 17' and 20'. The decentralizing arms 17' and 20' independently urge the associated skids against the borehole wall and thereby force the skids to follow closely most of the variations in the contour of the borehole 12.

Turning again to FIGURE 2A, skid 21 engages the residual film of mudcake 16. The skid 21 contains gamma ray measuring device, or gamma-gamma tool, 23. The gamma-gamma tool 23 preferably may be a dual spacing formation density device. Thus, the gamma-gamma tool 23 contains a source 25 that emits gamma rays, such as cesium-137, which irradiate the portion of the earth formation 13 adjacent to the skid 21. The gamma rays diffusing through the earth formation 13 are detected by a short spacing gamma ray detector 26 spaced longitudinally from the source 25 and a long spacing gamma ray detector 27 spaced from the source a substantially greater distance than the detector 26. The detector 26 may be a Geiger-Müller counting tube and detector 27 may be a scintillation counter.

This arrangement of source and detectors produces signals that correspond to the bulk density of the earth formation 13. The theory, construction and operation of the gamma ray measuring device 23 are described more completely in "Duel Spacing Formation Density Log" by J. S. Wahl, J. Tittman, C. W. Johnstone and R. P. Alger, Journal of Petroleum Technology, December 1964, pages 1411–1416; "The Physical Foundations of Formation Density Logging (Gamma-Gamma)" by J. Tittman and J. S. Wahl, Geophysics, April 1965, pages 284–294; "Formation Density Log Applications in Liquid-Filled Holes" by R. P. Alger, L. L. Raymer, Jr., W. R. Hoyle and M. P. Tixier, Journal of Petroleum Technology, March 1963, pages 321–332; and U.S. patent application Ser. No. 243,300, filed Dec. 10, 1962, by John S. Wahl for "Compensated Gamma-Gamma Logging Tool" now U.S. Patent No. 3,321,625 issued May 23, 1967 and assigned to the same assignee as the invention described herein.

Accordingly, the gamma ray detectors 26 and 27, in response to the gamma rays irradiating the formation 13, produce signals that characterize the formation bulk density. These density signals are transmitted from processing circuit 30 in the housing 11 through conductor 31 in the cable 15 to the earth's surface. The circuit 30 may comprise amplifiers, discriminators and the like, which are described in more detail in the aforementioned Wahl patent application.

A borehole caliper 32 also is combined with the decentralizing arm 17. The caliper 32 transmits signals to the earth's surface through conductor 33 in cable 15. These signals indicate variations in the borehole diameter as a result of caving, mudcake and the like.

The bulk density signals in conductor 31 are combined with the caliper signals in conductor 33 to compensate for any residual effects of borehole diameter changes, and the like, through the gamma ray porosity function former circuit 34. Function former circuit 34, moreover, produces a signal that corresponds to the gamma ray derived formation porosity $\phi_d$ in accordance with the following equation:

$$\phi_d = \frac{\rho_g - \rho_b}{\rho_g - \rho_f} \quad (1)$$

where $\rho_g$ is the grain density of the formation matrix; $\rho_b$ is the bulk density of the formation as determined through the gamma ray measurements hereinbefore described; and $\rho_f$ is the density of the fluid occupying the pore space within the formation 13 which usually is given a value of 1 gm./cc.

The function former circuit 34 preferably may take the form of operational amplifier circuits having resistor-diode type networks connected into the feedback circuits thereof. The amplifier gain adjustment provided by the feedback resistances enables the amplifiers to combine the signals applied to the conductors 31 and 33 according to the principles taught in the aforementioned Wahl Patent application and porosity Equation 1 to produce a signal in conductor 38 that corresponds to the gamma ray derived formation porosity $\phi_d$.

$\phi_n$, the porosity based on the diffusion of epithermal neutrons through the formation 13 is provided by means of an epithermal neutron measuring device 24. The epithermal neutron measuring device 24, shown in FIGURE 2A, is a sidewall tool of the type described in more detail in U.S. patent application Ser. No. 588,400, filed on Oct. 21, 1966, for an "Improvement in Epithermal Neutron Logging" by Harold Sherman and Jay Tittman, and assigned to the same assignee as the invention described herein.

The epithermal neutron measuring device 24 is spaced below the gamma-gamma device 23 and within the skid 22. The neutron device 24 preferably may have a five curie "chemical" neutron source 35 of plutonium-beryllium or americium-beryllium mounted in the skid 22 and abutting the formation 13 as closely as possible.

An epithermal neutron detector 36 is spaced axially above the neutron source 35 and adjacent to the inner surface of the skid 22 also to abut the portion of the formation 13 irradiated by the neutron source. The neutron detector 36 may be a helium-3 counting tube containing $He^3$ filling gas at a pressure of ten atmospheres. The neutron detector 36 has a hollow cylindrical cathode and a centrally disposed wire anode that defines an annular volume filled with the pressured $He^3$ gas (not shown).

A sheath 37 of cadmium approximately .02" thick encloses the cathode. Cadmium, by reason of an exceptionally large absorption cross section for thermal neutrons prevents these neutrons from entering the active volume of the detector 36. Additional shielding (not shown) can be interposed between the epithermal neutron detector and those portions of the housing not adjacent to the mudcake 16 and the earth formation 13.

This physical arrangement limits the neutron flux entering the active detector volume to a beam of epithermal neutrons diffusing from the portion of the formation 13 adjacent to the skid 22 toward the detector 36. The epithermal neutrons entering the active volume of the detector 36 initiate $He^3(n, p)H^3$ reactions which cause some of the gas between the cathode and the anode to ionize. This ionized gas produces a pulse in the electrodes, or a "count." By absorbing the thermal neutrons and thereby preventing thermal neutron counts from being registered in the detector 36, the influence of elements such as chlorine, boron, lithium, etc., in the formation is essentially eliminated.

The superatmospheric filling gas pressure within the epithermal neutron detector 36 concentrates substantially more filling gas neuclei per unit volume than other less satisfactory gas tubes that cannot operate with such high pressures. This increased filling gas nuclei concentration and the very high neutron capture cross section for $He^3$ greatly enhances the probability of nuclear reactions between the neutrons and the filling gas atoms, and thereby improves the statistical quality of the counting rate and the accuracy of the contingent porosity computation. $He^3$ tubes also are relatively insensitive to gamma radiation and thus will provide an output that characterizes the neutron population within the formation 13 without introducing spurious signals from the natural gamma radioactivity of the formation or from the gamma rays emitted by neutron source 35 or gamma ray source 25.

Each count registered in the epithermal neutron detector 36 is received by processing circuit 40 in the housing 11. The processing circuit 40 transmit a signal through conductor 41 and cable 15 to the earth's surface. The signal characterizes a property of the formation 13 measured by the diffusion of the irradiating epithermal neutrons. A more complete description of the specific characteristics of the epithermal neutron measuring device is available in the aforementioned Sherman et al. patent application.

The signal transmitted through the conductor 41 is converted into another signal that corresponds to the porosity of the earth formation 13 as a function of the epithermal neutrons diffusing therethrough. This signal conversion is accomplished by means of an epithermal neutron porosity function former circuit 42. The function former circuit 42 is similar in construction and operation to the gamma ray porosity function former circuit 34. The function former characteristics required to convert the epthermal neutron signal into formation porosity can be determined through experiments with formations of known porosities and mineral compositions.

Consequently, the signals applied to the output leads 38 and 43 of the function former circuits 34 and 42, respectively, describe the porosity of formation 13 as a function of gamma ray attenuation $\phi_d$ and the diffusion of epithermal neutrons $\phi_n$. $\phi_d$ is subject to error caused by variations in mineral grain density $\rho_g$ as demonstrated in Equation 1. $\phi_n$, moreover, is influenced by the matrix effect, or the presence of more than one mineral in the earth formation 13. To reduce these sources of error in accordance with an aspect of the invention, a porosity computer 44 (FIGURE 2B) is provided to combine the $\phi_n$ and $\phi_d$ signals into a more accurate porosity value $\phi_{cp}$ by simulating the characteristics of the curves shown on the graph in FIGURE 1.

The correct formation porosity $\phi_{cp}$ is a function of the slopes of the constant porosity lines 45 (FIGURE 1) and $\phi_n$ and $\phi_d$ in accordance with the following equation:

$$\phi_{cp} = \phi_d - B(\phi_d - \phi_n) \quad (2)$$

where B is a positive constant that is derived from experimental data. The computer 44 (FIGURE 2B) accomplishes the mathematical manipulations required to combine B, $\phi_d$ and $\phi_n$ into a signal that corresponds to $\phi_{cp}$.

More specifically, a signal corresponding to $\phi_n$ is applied to an amplifier 46 in the computer 44 through lead 43 from the epithermal neutron porosity function former circuit 42 shown in FIGURE 2A. The amplifier 46 converts $\phi_n$ into a signal that corresponds to $-\phi_n$. The $-\phi_n$ signal is transmitted through lead 47 and input resistance 60 to an amplifier 50 which combines the epithermal neutron signal $\phi_n$ with the gamma ray signal $\phi_d$ which was sent thorough conductor 38 and amplifier input resistance 57. The output signal of the amplifier 50 on the conductor 53 corresponds to the expression:

$$-B(\phi_d - \phi_n) \quad (3)$$

The gain of the amplifier 50 must change in order to reflect the difference in the slopes of the lines 45 of constant porosity (FIGURE 1) as these slopes change above and below the limestone curve 51. Accordingly, when the polarity of the difference between the signals $\phi_d$ and $-\phi_n$ changes, for example, from a positive to a negative value, diode 54 is forward biased and establishes a feedback path for the amplifier 50 through resistance 52. This feedback resistance changes the gain of the amplifier to match the slope of the appropriate constant porosity lines 45. If the combination of the input signals $\phi_d$ and $-\phi_n$ is positive, diode 54 is reverse biased and effectively disconnects resistance 52 from the amplifier 50. In this circumstance, diode 55 is forward biased and feedback resistance 56 conducts, causing the gain of the amplifier 50 to shift and simulate the slope of a new line of constant porosity. Thus, the feedback resistances 52 and 56 adjust the gain of the amplifier 50 to match the lines 45 of constant porosity shown in FIGURE 1 in accordance with the following correction factors:

If $\phi_d - \phi_n > 0$, then $$B = R_{56}/R_{57} \quad (4)$$

If $\phi_d - \phi_n < 0$, then $$B = R_{52}/R_{57} \quad (5)$$

where $R_{52}$, $R_{56}$, and $R_{57}$ are the numerical values of the resistances 52, 56 and 57, respectively.

In accordance with a feature of the invention, the difference between $\phi_n$ and $\phi_d$ characterized by the output signal of amplifier 50 is proportional to the relative displacement from the limestone curve 51 of, for example, the point 10 (FIGURE 1) on the line of computed porosity $\phi_{cp}$. Consequently, the porosity difference signal in the expression (3) that is applied to the conductor 53 also corresponds to the relative proportions of the minerals that form the rock structure of the earth formation 13. This porosity difference signal is sent through lead 61 to an appropriately calibrated matrix composition recorder 62. The recorder 62 may be, for example, a recording galvanometer that produces a log of matrix composition as a function of the depth of the borehole 12.

In accordance with another feature of the invention, the porosity difference signal in conductor 53 is transmitted to amplifier 63 which, through an input and feedback resistance network 68, combines the difference signal characterizing Equation 3 with the signal $\phi_d$ in conductor 38. These signals, combined by the amplifier 63, produce an output signal in conductor 65 that corresponds to the equation:

$$\phi_{cp} = \phi_d - B(\phi_d - \phi_n) \quad (6)$$

Because the output of the amplifier 63 corresponds to the more accurate computed formation porosity $\phi_{cp}$, the signal is applied through the conductor 65 to an appropriately calibrated true porosity recorder 66. The recorder 66, conveniently may be a recording galvanometer that produces a log of true porosity in terms of borehole depth.

In accordance with a further aspect of the invention, the presence of natural gas producing zones in the earth formation 13 can be identified if the formation lithology is known with accuracy.

Accordingly, point 10 in FIGURE 1 may be plotted, for example, by entering the graph with values of $\phi_n$ and $\phi_d$ computed in the manner hereinbefore described. As previously noted, the positon of point 10 between the limestone and dolomite curves indicates that the matrix is composed of a mixture of 60 percent limestone and 40 percent dolomite. If, however, the formation is known, from examining drill cuttings and the like, to be composed of a mixture of 50 percent limestone and 50 percent dolomite (as shown by the broken line 80), the inaccurate position of the point 10 vis-a-vis the known composition, indicates that natural gas is present in the formation 13. The true porosity ($\phi_t$) of the formation 13 is determined by shifting the point 10 down and to the right to intersect line 80 in a direction that is generally parallel to the gas correction (carbonate) line 81. This corrected intersection point 10' coincides with an 11 percent line of constant porosity, which is the true formation porosity.

In a similar manner, gas-bearing sandstone formations can be identified and the true porosity of such formations can be determined by applying the slope of the gas correction (sandstone) line 82 to the points in FIGURE 1 that are determined by the $\phi_n$ and $\phi_d$ computations hereinbefore described. An appropriate function former circuit 83 (FIGURE 2B) also can be provided to indicate gas and to apply the formation porosity correction. Thus, if the formation is limestone and $$\phi_t = .55\phi_d + .45\phi_n \quad (7)$$

gas saturation $S_g$ will be $$S_g = 1 - \frac{\phi_n}{.55\phi_d + .45\phi_n} \quad (8)$$

Consequently, the function former circuit 83 provides signals in response to $\phi_d$ and $\phi_n$ that correspond to $\phi_t$ and $S_g$ as a function of borehole depth by solving Equations 7 and 8.

When other lithologies are present, the same formulation can be applied if an appropriate matrix composition circuit 84 is connected to the function former circuit 83 to apply the correct factors to the values of $\phi_d$ and $\phi_n$ in Equation 7 and 8. Gas saturation recorder 85 registers $S_g$ as a function of borehole depth, while $\phi_t$ is sent directly to true porosity recorder 66.

Although the embodiment of the invention described herein is directed to liquid-or mud-filled boreholes, curves for air- or gas-filled boreholes can be developed that are similar to those which are shown in FIGURE 1. Such a graph can be constructed through measurements of laboratory or field formations of known porosities and mineral compositon. A hole size correction also can be applied to the epithermal neutron porosity function former current 42 to provide an even more precise value of $\phi_n$ by applying the borehole caliper signal in the conductor 33 to the circuit 42.

Gamma-gamma and epithermal neutron logging equipment of the general character described in connection with the embodiment of the invention shown in FIGURE 2A can be provided in the skids 21' and 22' of the tool illustrated in FIGURE 4.

While there have been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A well logging system for measuring earth formation characteristics comprising means for producing a signal that corresponds to a gamma radiation derived electron density characteristic of the earth formation, means for producing a signal that corresponds to a characteristic of the earth formation measured by the scattering of epithermal neutrons therethrough, and circuit means for combining said signals to produce still another signal that more precisely relates to a characteristic of the earth formation porosity.

2. A well logging system according to claim 1 wherein said gamma radiation derived signal means comprises a gamma ray source and a plurality of gamma ray detectors spaced from said source at different distances.

3. A well logging system for measuring the relative quantities of the minerals in an earth formation matrix comprising means for producing a signal that corresponds primarily to the electron density of the earth formation, means for producing a signal that corresponds to the diffusion of epithermal neutrons through the earth formation, and circuit means for combining said signals to generate another signal that is proportional to at least one of the minerals in the matrix.

4. A well logging system according to claim 3 comprising further circuit means for combining said signals to produce still another signal that corresponds to the earth formation porosity.

5. A well logging system for identifying natural gas in an earth formation comprising means for producing a gamma radiation derived signal that corresponds to an electron density characteristic of the earth formation, means for producing a signal that corresponds to the diffusion of epithermal neutrons through the formation, and computer means for comparing a predetermined earth formation characteristic with said signals to produce still another signal that is indicative of natural gas within the earth formation.

6. Apparatus for measuring earth formation characteristics comprising a gamma radiation device for measuring an electron density characteristic of the earth formation, a neutron device with an epithermal neutron radiation detector spaced from said gamma radiation device for measuring another property of the formation distinguished largely by the diffusion of said epithermal neutrons therethrough, biasing means for urging said gamma and neutron devices against the earth formation, and circuit means responsive to said gamma and neutron device measurements for combining said measurements and computing a corrected measured characteristic of the earth formation.

7. Apparatus for measuring earth formation characteristics according to claim 6 wherein said gamma radiation device comprises a source of gamma rays, and a pair of gamma ray detectors spaced at different distances from said gamma ray source.

8. Apparatus for measuring earth formation characteristics according to claim 7 comprising further circuit means for comparing said gamma and epithermal neutron measurements and indicating another characteristic of the earth formation that depends on the mineral composition thereof.

9. Apparatus for indicating natural gas in an earth formation comprising a gamma radiation device for measuring an electron density characteristic of the earth formation, a neutron device with an epithermal neutron detector for measuring a characteristic of the formation, biasing means for urging said gamma and neutron devices against the earth formation, and circuit means for comparing a predetermined characteristic of the earth formation with said measured characteristics to produce a signal that is related to the presence of natural gas within the earth formation.

10. Apparatus for indicating natural gas in an earth formation according to claim 9 wherein said gamma radiation device comprises detector means spaced to indicate the scattering of said gamma rays within the earth formation.

References Cited

UNITED STATES PATENTS

| | | |
|---|---|---|
| 2,761,977 | 9/1956 | McKay. |
| 2,934,652 | 4/1960 | Caldwell et al. |
| 3,004,160 | 10/1961 | Title _____ 250—83.1 |
| 3,147,378 | 9/1964 | Hall. |
| 3,244,880 | 4/1966 | Owen _____ 250—83.1 X |

RALPH G. NILSON, *Primary Examiner.*

A. B. CROFT, *Assistant Examiner.*

U.S. Cl. X.R.

250—83.1, 83.6